United States Patent
Hsieh et al.

(10) Patent No.: US 8,072,435 B2
(45) Date of Patent: Dec. 6, 2011

(54) MOBILE ELECTRONIC DEVICE, METHOD FOR ENTERING SCREEN LOCK STATE AND RECORDING MEDIUM THEREOF

(75) Inventors: Chin-Ying Hsieh, Taoyuan County (TW); Sih-Jie Gu, Taoyuan County (TW); Drew Bamford, Taoyuan County (TW)

(73) Assignee: HTC Corporation, Taoyuan County (TW)

( * ) Notice: Subject to any disclaimer, the term of this patent is extended or adjusted under 35 U.S.C. 154(b) by 391 days.

(21) Appl. No.: 12/272,811

(22) Filed: Nov. 18, 2008

(65) Prior Publication Data

US 2009/0264157 A1     Oct. 22, 2009

(30) Foreign Application Priority Data

Apr. 16, 2008   (TW) .............................. 97113776 A

(51) Int. Cl.
*G06F 3/041*     (2006.01)
(52) U.S. Cl. ...................... 345/173; 455/566; 455/414.1
(58) Field of Classification Search .................. 455/566, 455/414.1; 345/173
See application file for complete search history.

(56) References Cited

U.S. PATENT DOCUMENTS

| | | | |
|---|---|---|---|
| 6,664,951 B1 * | 12/2003 | Fujii et al. ...................... | 345/173 |
| 7,123,243 B2 * | 10/2006 | Kawasaki et al. ............. | 345/173 |
| 7,627,350 B2 * | 12/2009 | Enns et al. ..................... | 455/566 |
| 7,825,912 B2 * | 11/2010 | Lee ................................ | 345/175 |
| 2003/0034185 A1 * | 2/2003 | Kaikuranta ................ | 178/18.01 |
| 2006/0012577 A1 * | 1/2006 | Kyrola .......................... | 345/173 |
| 2007/0142094 A1 | 6/2007 | Enns et al. | |
| 2007/0275703 A1 * | 11/2007 | Lim et al. ................... | 455/414.1 |
| 2009/0303194 A1 * | 12/2009 | Kumamoto ................... | 345/173 |

FOREIGN PATENT DOCUMENTS

| | | |
|---|---|---|
| CN | 1405728 | 3/2003 |
| CN | 1758199 | 4/2006 |
| CN | 1985234 | 6/2007 |

OTHER PUBLICATIONS

"Office Action of Taiwan Counterpart Application", issued on Aug. 12, 2011, p.1-p.6, in which the listed references were cited.

* cited by examiner

*Primary Examiner* — Lester Kincaid
*Assistant Examiner* — Isaak R Jama
(74) *Attorney, Agent, or Firm* — Jianq Chyun IP Office

(57) ABSTRACT

A mobile electronic device, a method for entering a screen lock state and a recording medium thereof are provided. In the present method, an input signal is received through a touch panel of the mobile electronic device. Then, a movement track of the input signal is obtained if a starting point of the input signal is located in a non-display area of the touch panel, and a vertical displacement of the input signal is calculated if the movement track contains a specific direction. Finally, a screen lock frame is dragged and displayed, and the mobile electronic device is switched to the screen lock state if the displacement reaches a predetermined value. Thereby, an intuitional way for locking the screen is provided, and accordingly, the convenience in operating the mobile electronic device is improved.

26 Claims, 4 Drawing Sheets

MOBILE ELECTRONIC DEVICE, METHOD FOR ENTERING SCREEN LOCK STATE AND RECORDING MEDIUM THEREOF

CROSS-REFERENCE TO RELATED APPLICATION

This application claims the priority benefit of Taiwan application serial no. 97113776, filed on Apr. 16, 2008. The entirety of the above-mentioned patent application is hereby incorporated by reference herein and made a part of specification.

BACKGROUND OF THE INVENTION

1. Field of the Invention

The present invention generally relates to the related applications of a mobile electronic device, and more particularly, to a method for entering a screen lock state of a mobile electronic device and a recording medium thereof.

2. Description of Related Art

Along with the development of technologies, consumers' requirement cannot be met by simply integrating multiple functions into one electronic device. The operation of a fully functional electronic device has to be very convenient in order to meet the increasing demand of today's consumers. For example, hardware keypad is usually used as the input interface for cell phones in early stage. However, touch screen has gradually replaced hardware keypad as the input interface of cell phones for it is more convenient, intuitional, durable, and inexpensive.

Even though it is very convenient to operate a cell phone through a touch screen, a mechanism for preventing the user from mistakenly touching the touch screen, and accordingly turning on an unwanted function, has to be provided. Namely, when the user does not need to operate the cell phone, the cell phone is set to a screen lock state to turn off the input function of the touch screen. Such a mechanism becomes very important when the user places the cell phone in a pocket or a bag. The user does not have to worry about dialing the cell phone unconsciously once the cell phone enters the screen lock state.

Regarding a smartphone with built-in Microsoft Windows Mobile OS, a screen lock icon is displayed in the main frame, and a user can turn on the screen lock function by clicking on the icon. Once the user clicks the icon, the input function of the touch screen is turned off until the user unlocks the touch screen.

SUMMARY OF THE INVENTION

Accordingly, the present invention is directed to a method for entering a screen lock state, wherein a user turns on a screen lock function through a sliding operation on a touch panel or a touch screen so that the operation is made very intuitional.

The present invention is directed to a mobile electronic device, wherein whether the mobile electronic device enters a screen lock state is determined according to the touch operation of a user, so that the operation of the mobile electronic device is made very convenient.

The present invention provides a method for entering a screen lock state, wherein the method is suitable for a mobile electronic device in an operational state. The mobile electronic device has a touch panel, and the touch panel includes a display area and a non-display area. In the present method, first, an input signal is received through the touch panel. Then, whether a starting point of the input signal is located in the non-display area is determined. A movement track of the input signal is obtained if the starting point is located in the non-display area, and a vertical displacement of the input signal is calculated when the movement track contains a specific direction. Finally, the mobile electronic device is switched to the screen lock state when the displacement reaches a predetermined value.

According to an embodiment of the present invention, the step of switching the mobile electronic device to the screen lock state when the displacement reaches the predetermined value includes switching the mobile electronic device to the screen lock state when the vertical component reaches the predetermined value.

According to an embodiment of the present invention, the step of switching the mobile electronic device to the screen lock state includes dragging and displaying a screen lock frame in the display area from an edge of the display area closest to the starting point along the movement track and turning off the function of the mobile electronic device for receiving operations, wherein the screen lock frame is a full screen frame completely covering the display area, and information displayed in the screen lock frame includes at least a battery capacity, a signal strength, a date/time, a missed call, an unread e-mail, an unread short message, an unread voice mail, and a ring mode.

The present invention provides a recording medium for recording a computer program, wherein the computer program includes a plurality of program codes, and the computer program can be loaded into a mobile electronic device to allow the mobile electronic device to execute foregoing method for entering the screen lock state.

The present invention provides a method for entering a screen lock state, wherein the method is suitable for a mobile electronic device in an operational state. The mobile electronic device has a touch screen, and the touch screen includes a status bar display area and an operation area. In the present method, first, an input signal is received through the touch screen. Then, whether a starting point of the input signal is located in the status bar display area is determined. A movement track of the input signal is obtained if the starting point is located in the status bar display area, and a vertical displacement of the input signal is calculated when the movement track contains a specific direction. Finally, the mobile electronic device is switched to the screen lock state when the displacement reaches a predetermined value.

According to an embodiment of the present invention, the step of switching the mobile electronic device to the screen lock state when the displacement reaches the predetermined value includes switching the mobile electronic device to the screen lock state when the vertical component reaches the predetermined value.

According to an embodiment of the present invention, the step of switching the mobile electronic device to the screen lock state includes dragging and displaying a screen lock frame in the touch screen from an edge of the touch screen closest to the starting point along the movement track and turning off the function of the mobile electronic device for receiving operations, wherein the screen lock frame is a full screen frame completely covering the touch screen, and information displayed in the screen lock frame includes at least a battery capacity, a signal strength, a date/time, a missed call, an unread e-mail, an unread short message, an unread voice mail, and a ring mode.

According to an embodiment of the present invention, the status bar display area is fixed to an upper position of the touch screen, and information displayed in the status bar display area includes at least a battery capacity, a signal strength, a date/time, and a ring mode. The operation area is used for displaying a user interface when the mobile electronic device is in the operational state and receiving an operation corresponding to the user interface.

The present invention provides a recording medium for recording a computer program, wherein the computer program includes a plurality of program codes, and the computer program can be loaded into a mobile electronic device to allow the mobile electronic device to execute foregoing method for entering the screen lock state.

The present invention provides a mobile electronic device including a touch panel, an input signal movement detecting module, and a processor module. The touch panel includes a non-display area and a display area and is used for receiving an input signal. The input signal movement detecting module is connected to the touch panel and is used for determining whether a starting point of the input signal is located in the non-display area, obtaining a movement track of the input signal if the starting point is located in the non-display area, and calculating a vertical displacement of the input signal when the movement track contains a specific direction. The processor module is connected to the touch panel and the input signal movement detecting module and is used for switching the mobile electronic device to the screen lock state when the displacement reaches a predetermined value.

According to an embodiment of the present invention, the processor module switches the mobile electronic device to the screen lock state when the vertical component reaches the predetermined value.

According to an embodiment of the present invention, the processor module drags and displays a screen lock frame in the display area from an edge of the display area closest to the starting point along the movement track and turns off the function of the mobile electronic device for receiving operations, wherein the screen lock frame is a full screen frame completely covering the display area, and information displayed in the screen lock frame includes a battery capacity, a signal strength, a date/time, a missed call, an unread e-mail, an unread short message, an unread voice mail, and a ring mode etc.

The present invention provides a mobile electronic device including a touch screen, an input signal movement detecting module, and a processor module. The touch screen is used for receiving an input signal and which includes a status bar display area and an operation area. The input signal movement detecting module is connected to the touch screen and is used for determining whether a starting point of the input signal is located in the status bar display area, obtaining a movement track of the input signal if the starting point is located in the status bar display area, and calculating a vertical displacement of the input signal when the movement track contains a specific direction. The processor module is connected to the touch screen and the input signal movement detecting module and is used for switching the mobile electronic device to a screen lock state when the displacement reaches a predetermined value.

According to an embodiment of the present invention, the processor module switches the mobile electronic device to the screen lock state when the vertical component reaches the predetermined value, wherein the processor module drags and displays a screen lock frame in the touch screen from an edge of the touch screen closest to the starting point along the movement track and turns off the function of the mobile electronic device for receiving operations.

According to an embodiment of the present invention, the screen lock frame is a full screen frame completely covering the touch screen, and information displayed in the screen lock frame includes at least a battery capacity, a signal strength, a date/time, a missed call, an unread e-mail, an unread short message, an unread voice mail, and a ring mode.

According to an embodiment of the present invention, the status bar display area is fixed to an upper position of the touch screen, and information displayed in the status bar display area includes at least a battery capacity, a signal strength, a date/time, and a ring mode, etc. The operation area is used for displaying a user interface when the mobile electronic device is in an operational state and receiving an operation corresponding to the user interface.

In the present invention, whether a mobile electronic device is switched to a screen lock state is determined according to the position touched by a user on a touch screen or a touch panel and a relative movement track. Thereby, a more intuitional and convenient method for turning on a screen lock function is provided.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
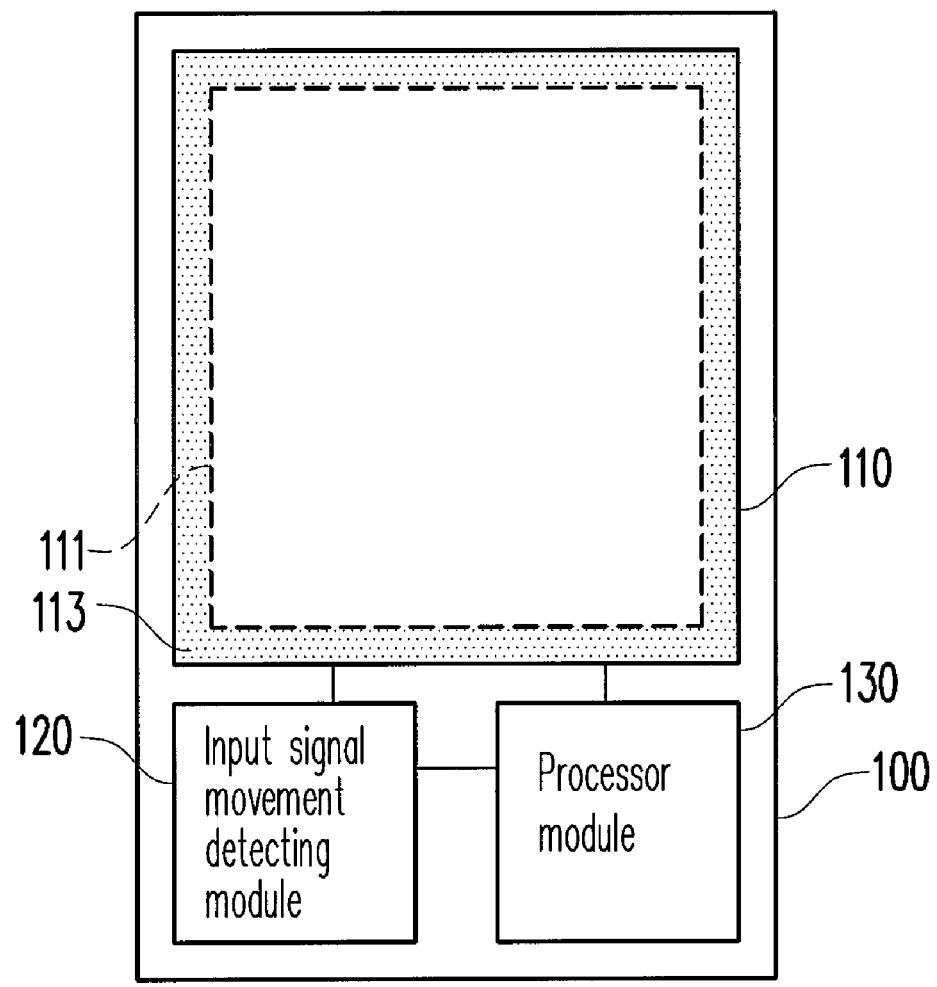
FIG. 1 is a block diagram of a mobile electronic device according to an embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a block diagram of a mobile electronic device according to an embodiment of the present invention. Referring to FIG. 1, the mobile electronic device 100 includes a touch panel 110, an input signal movement detecting module 120, and a processor module 130. The mobile electronic device 100 may be a cell phone, a personal digital assistant (PDA), or a smartphone; however, the present invention is not limited thereto.

The touch panel 110 is used for detecting a touch operation of a user and receiving a corresponding input signal. In the present embodiment, the touch panel 110 includes a display area 111 and a non-display area 113. The display area 111 is used for displaying an operation frame (for example, a user interface of an application program) of the mobile electronic device 100. However, both the display area 111 and the non-display area 113 can receive an input signal generated by the touch operation of the user.

The input signal movement detecting module 120 is connected to the touch panel 110 and is used for determining whether a starting point of the input signal is located in the non-display area 113, obtaining a movement track of the input signal if the starting point is located in the non-display area 113, and calculating a vertical displacement of the input signal when the movement track contains a specific direction.

The processor module 130 is connected to both the touch panel 110 and the input signal movement detecting module 120 and is used for switching the mobile electronic device 100 to a screen lock state when the vertical displacement of the input signal reaches a predetermined value.

In other words, through the operation of the input signal movement detecting module 120 and the processor module 130, a user needs only to touch the non-display area 113 on the touch panel 110 and move his finger (or any other input tool, such as a stylus) along the specific direction, and the mobile electronic device 100 is then switched from, for example, an operational state, to the screen lock state once the vertical displacement reaches the predetermined value.

Figure 2:
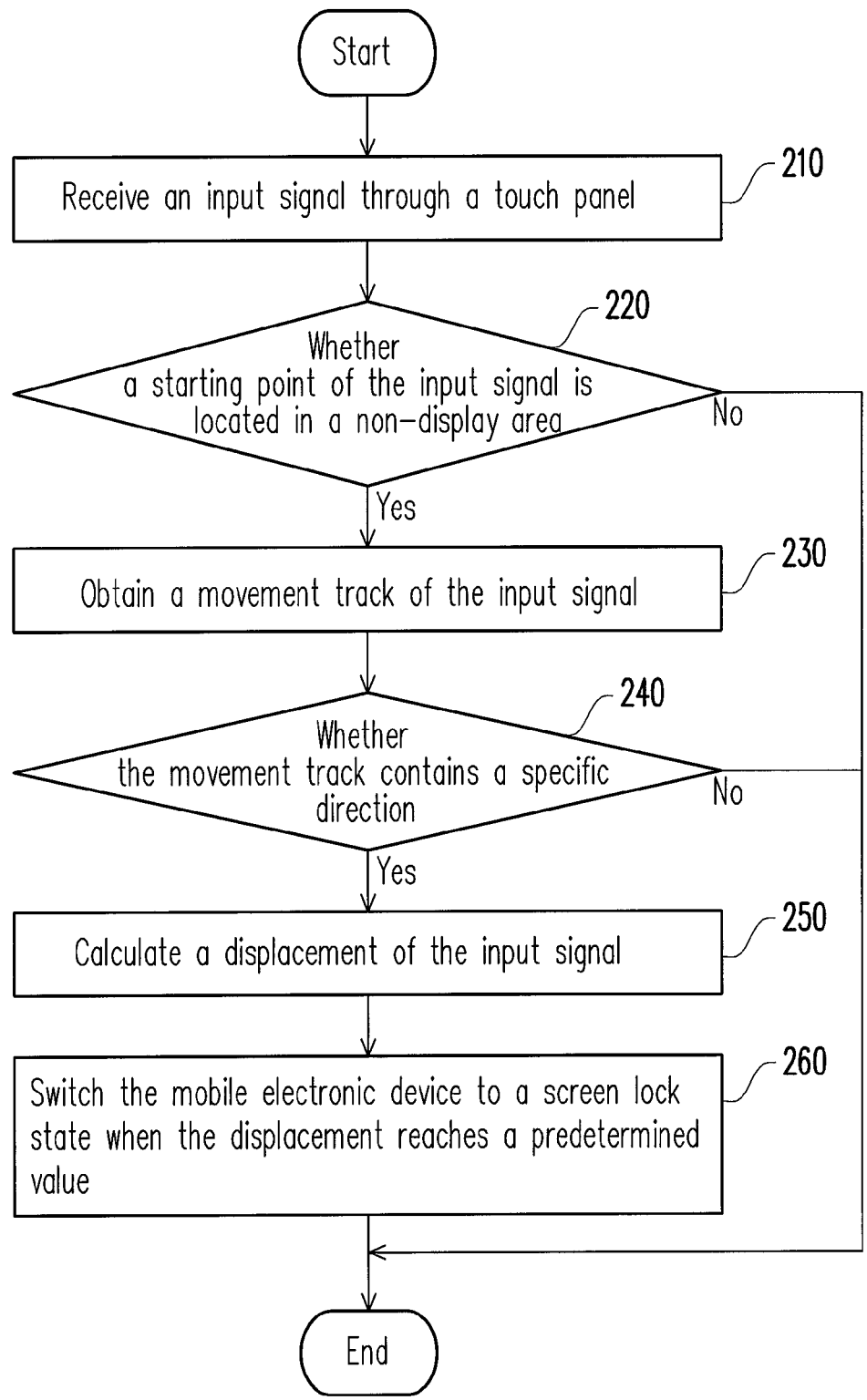
FIG. 2 is a flowchart of a method for entering a screen lock state according to an embodiment of the present invention.

The detailed steps for the mobile electronic device 100 to enter the screen lock state will be further described with reference to the following embodiment. FIG. 2 is a flowchart of a method for entering the screen lock state according to an embodiment of the present invention. Referring to both FIG. 1 and FIG. 2, first, in step 210, the touch panel 110 receives an input signal generated by a touch operation of a user.

Then, in step 220, the input signal movement detecting module 120 determines whether a starting point of the input signal is located in the non-display area 113. If the starting point of the input signal is located in the non-display area 113, then in step 230, a movement track of the input signal is obtained. Next, in step 240, whether the movement track contains a specific direction is determined. If the movement track contains the specific direction, then in step 250, a displacement (e.g. a vertical displacement) of the input signal is calculated.

For the convenience of description, it is assumed hereinafter that the specific direction is a downward direction. In an embodiment of the present invention, when the user touches the non-display area 113 and slides his finger (or any other input tool) vertically downwards, the input signal movement detecting module 120 starts to calculate the vertical displacement of the input signal. In another embodiment of the present invention, when the user touches the non-display area 113 and slides his finger towards left bottom or right bottom of the touch panel, the input signal movement detecting module 120 also calculates the vertical displacement of the input signal since the corresponding movement track contains the downward direction.

Finally, in step 260, the processor module 130 switches the mobile electronic device 100 to the screen lock state when the vertical displacement of the input signal reaches a predetermined value. As described in foregoing embodiment, the specific direction is a downward direction. Accordingly, the processor module 130 switches the mobile electronic device 100 to the screen lock state when the vertical component of the vertical displacement reaches the predetermined value.

When the processor module 130 switches the mobile electronic device 100 to the screen lock state, first, the processor module 130 drags and displays a screen lock frame in the display area 111 from an edge of the display area 111 closest to the starting point of the input signal along the movement track of the input signal. Then, the processor module 130 turns off the function of the mobile electronic device 100 for receiving operations. In an embodiment of the present invention, the processor module 130 only turns off the main functions (for examples, functions for making phone calls, playing video/audio files, and capturing images) of the mobile electronic device 100. In other words, the user can still use some functions of the mobile electronic device 100 through the screen lock frame after the mobile electronic device 100 enters the screen lock state.

It has to be noted herein that the screen lock frame displayed by the processor module 130 is a full screen frame which completely covers the display area 111. Information displayed in the screen lock frame includes a battery capacity, a signal strength, a date/time, a missed call, an unread e-mail, an unread short message, an unread voice mail, and a ring mode, etc, wherein the missed call may correspond to a voice call or a video call, and the unread e-mail may be an unread text e-mail or multimedia e-mail. Thus, the user can still browse related information of the mobile electronic device 100 through the screen lock frame after the mobile electronic device 100 enters the screen lock state.

Foregoing method for entering the screen lock state may be executed in any mobile electronic device having a processor. In other words, foregoing embodiment can be designed as a computer program having a plurality of program codes, and the computer program is recorded in a computer-readable recording medium (for example, a CD, a floppy disk, or a removable hard disk, etc). After the computer program is loaded into a mobile electronic device, the method described in foregoing embodiment for entering the screen lock state can then be executed by the mobile electronic device.

As described above, when a user uses a mobile electronic device disposed with a touch panel, the mobile electronic device which is originally in, for example, an operational state, is switched to a screen lock state through a sliding operation containing a specific direction and having a vertical displacement of a predetermined value.

Figure 3:
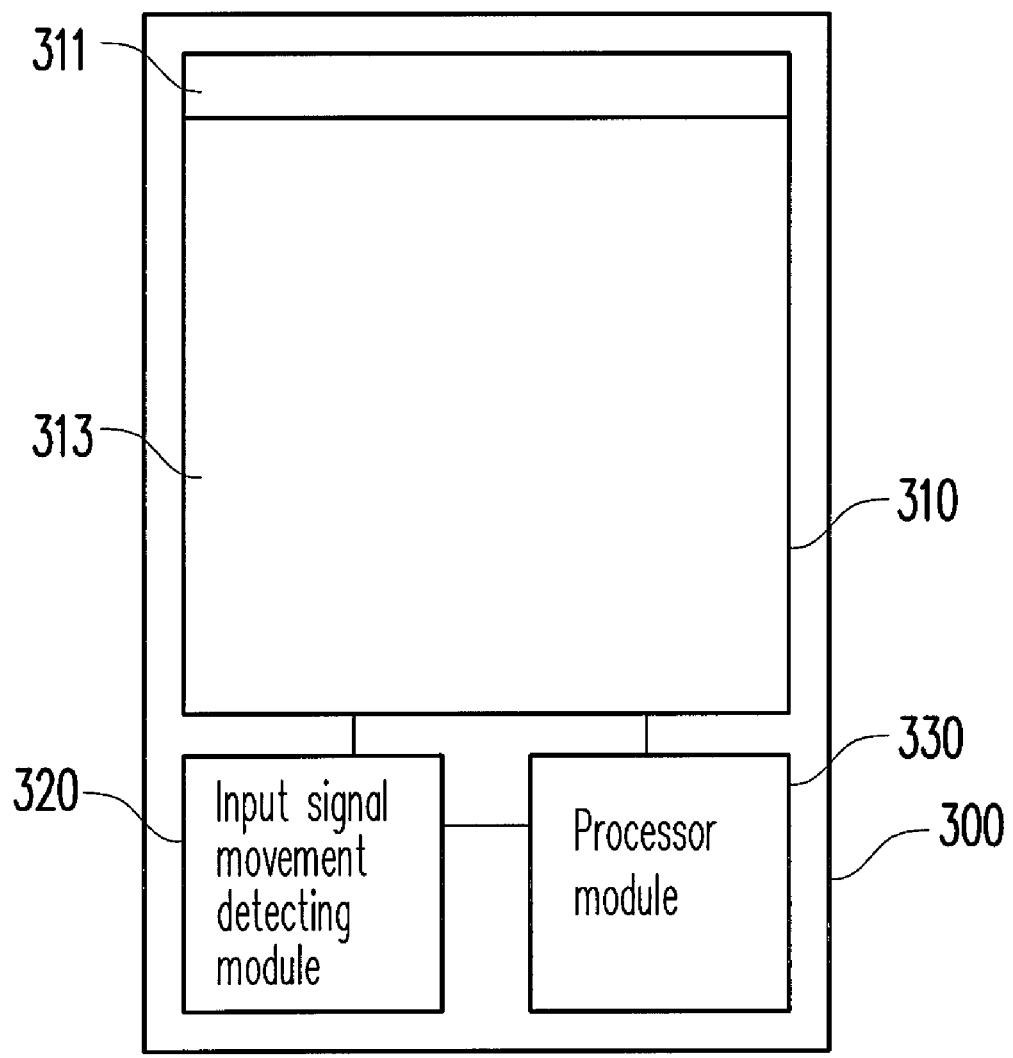
FIG. 3 is a block diagram of a mobile electronic device according to another embodiment of the present invention.

The present invention is further described in the following embodiment with a mobile electronic device having a touch screen as an example. FIG. 3 is a block diagram of the mobile electronic device according to another embodiment of the present invention. Referring to FIG. 3, the mobile electronic device 300 in the present embodiment may be a cell phone, a PDA, or a smartphone; however, the present invention is not limited thereto. The mobile electronic device 300 includes a touch screen 310, an input signal movement detecting module 320, and a processor module 330.

The touch screen 310 can be used for displaying frames and receiving touch operations of a user. Accordingly, the touch screen 310 serves as an input/output interface of the mobile electronic device 300. In the present embodiment, the touch screen 310 includes a status bar display area 311 and an operation area 313. As shown in FIG. 3, the status bar display area 311 is fixed to an upper position of the touch screen 310 and is used for displaying information such as a battery capacity, a signal strength, a date/time, an unread voice mail, and a ring mode. The operation area 313 located below the status bar display area 311 is used for displaying a user interface of different application program and receiving an operation corresponding to the user interface when the mobile electronic device 300 is in an operational state.

The input signal movement detecting module 320 is connected to the touch screen 310 and is used for determining whether a starting point of an input signal generated by a touch operation of the user is located in the status bar display area 311 when the touch screen 310 receives the input signal. The input signal movement detecting module 320 obtains a movement track of the input signal if the starting point is located in the status bar display area 311 and calculates a vertical displacement of the input signal when the movement track contains a specific direction.

The processor module 330 is connected to both the touch screen 310 and the input signal movement detecting module 320 and is used for automatically switching the mobile electronic device 300 to the screen lock state when the vertical displacement of the input signal reaches a predetermined value. The detailed steps for the mobile electronic device 300 to enter the screen lock state will be described below with reference to FIG. 4.

First, in step 410, the touch screen 310 receives an input signal generated by a touch operation of a user. Then, in step 420, the input signal movement detecting module 320 determines whether a starting point of the input signal is located in the status bar display area 311. If the starting point is located in the status bar display area 311, the input signal movement detecting module 320 obtains a movement track of the input signal (step 430), determines whether the movement track contains a specific direction (for example, a downward direction) (step 440), and calculates a vertical displacement of the input signal if the movement track contains the specific direction (step 450).

Finally, in step 460, the processor module 330 switches the mobile electronic device 300 to the screen lock state when the vertical displacement of the input signal reaches a predetermined value. In the present embodiment, the specific direction is a downward direction, and accordingly the processor module 330 switches the mobile electronic device 300 to the screen lock state when the vertical component corresponding to the input signal reaches the predetermined value. Meanwhile, the processor module 330 drags and displays a screen lock frame from an edge of the touch screen 310 closest to the starting point of the input signal along the movement track and turns off the function of the mobile electronic device 300 for receiving operations. In an embodiment of the present invention, the processor module 330 does not turn off all the functions of the mobile electronic device 300 but only some of the main functions so that the user can still operate the other functions through the screen lock frame.

It can be understood from foregoing description that when the user touches the status bar display area 311 and slides his finger (or any other input tool) towards the bottom, lower left, or lower right of the touch screen 310, the mobile electronic device 300 is switched to the screen lock state once the vertical component corresponding to the vertical displacement reaches the predetermined value. After the mobile electronic device 300 enters the screen lock state, the user can see a screen lock frame which completely covers the touch screen 310. Namely, the screen lock frame is a full screen frame covering both the status bar display area 311 and the operation area 313. Since information such as a battery capacity, a signal strength, a date/time, a missed call (including voice call or video call), an unread e-mail (including text e-mail and multimedia e-mail), an unread short message, an unread voice mail, or a ring mode is displayed in the screen lock frame, the user can still obtain related information of the mobile electronic device 300 through the screen lock frame therefore won't mistake the screen lock state as a system shutdown.

Figure 4:
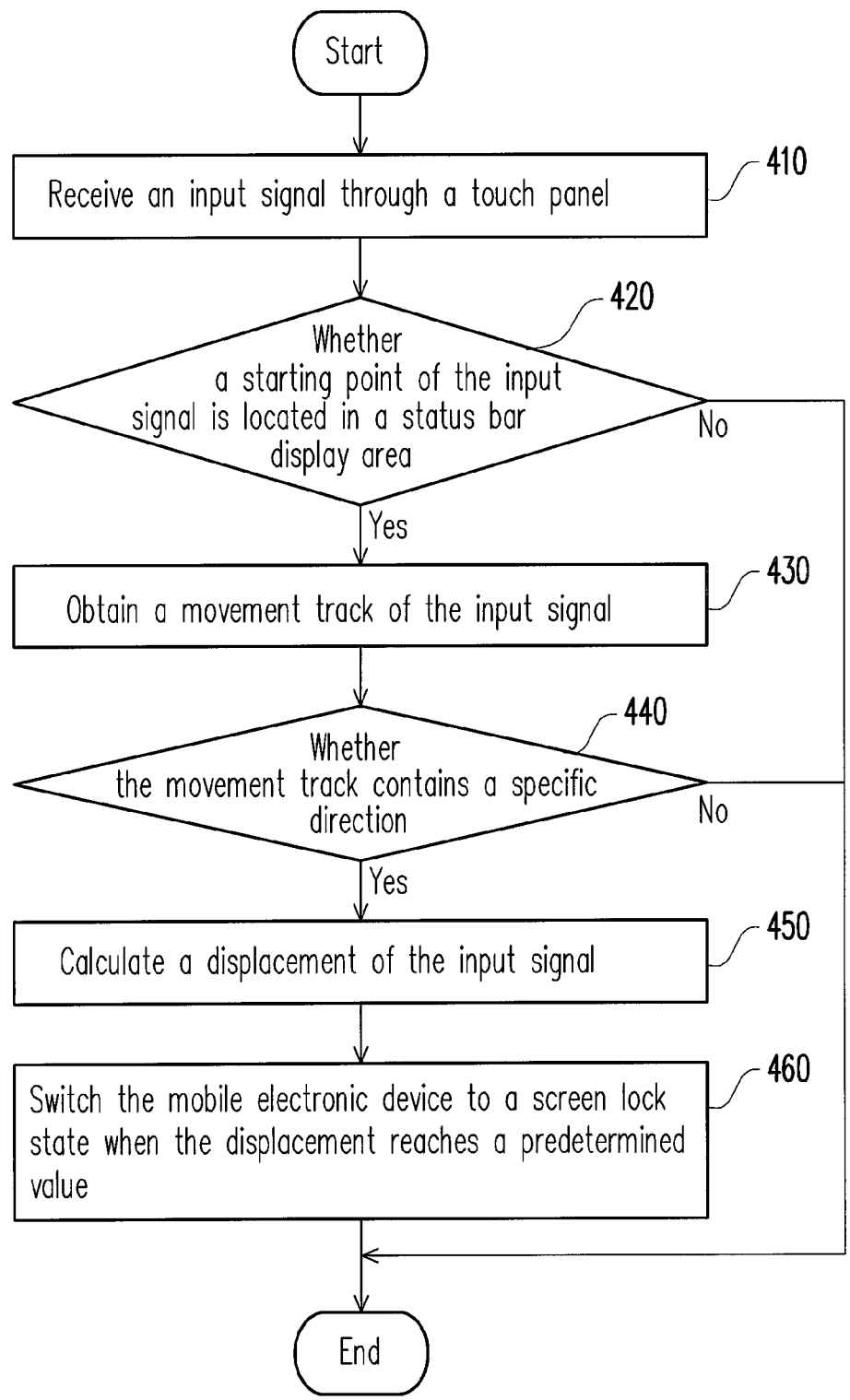
FIG. 4 is a flowchart of a method for entering a screen lock state according to another embodiment of the present invention.

The method illustrated in FIG. 4 for entering the screen lock state can be executed in any mobile electronic device having a processor. Foregoing embodiment can be designed as a computer program including a plurality of program codes, and the computer program is recorded in a computer-readable recording medium (for example, a CD, a floppy disk, or a removable disk). The computer program can be loaded into the mobile electronic device to allow the mobile electronic device to execute foregoing method for entering the screen lock state.

In overview, the present invention provides a mobile electronic device, a method for entering a screen lock state and a recording medium thereof, wherein whether the mobile electronic device is switched to the screen lock state is determined according to a starting position of a touch operation of a user on a touch screen or a touch panel, the movement direction, and the value of the displacement. In the present invention, the screen lock function is turned on through touching and sliding operation instead of the conventional method of clicking on an icon, so that the operation of the mobile electronic device is diversified and is made more convenient.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for entering a screen lock state, suitable for a mobile electronic device in an operational state, wherein the mobile electronic device has a touch panel, and the touch panel comprises a display area and a non-display area, the method comprising:

receiving an input signal through the touch panel;

determining whether a starting point of the input signal is located in the non-display area;

obtaining a movement track of the input signal if the starting point is located in the non-display area;

calculating a vertical displacement of the input signal when the movement track comprises a specific direction; and switching the mobile electronic device to the screen lock state when the displacement reaches a predetermined value.

2. The method according to claim 1, wherein the step of switching the mobile electronic device to the screen lock state when the displacement reaches the predetermined value comprises:

switching the mobile electronic device to the screen lock state when a vertical component of the vertical displacement reaches the predetermined value.

3. The method according to claim 1, wherein the step of switching the mobile electronic device to the screen lock state when the displacement reaches the predetermined value comprises:

dragging and displaying a screen lock frame in the display area from an edge of the display area closest to the starting point along the movement track; and turning off a function of the mobile electronic device for receiving operations.

4. The method according to claim 3, wherein the screen lock frame is a full screen frame completely covering the display area.

5. The method according to claim 3, wherein information displayed in the screen lock frame comprises at least one of a battery capacity, a signal strength, a date/time, a missed call, an unread e-mail, an unread short message, an unread voice mail, and a ring mode.

6. A method for entering a screen lock state, suitable for a mobile electronic device in an operational state, wherein the mobile electronic device has a touch screen, and the touch screen comprises a status bar display area and an operation area, the method comprising:

receiving an input signal through the touch screen;

determining whether a starting point of the input signal is located in the status bar display area;

obtaining a movement track of the input signal if the starting point is located in the status bar display area;

calculating a vertical displacement of the input signal when the movement track comprises a specific direction; and switching the mobile electronic device to the screen lock state when the displacement reaches a predetermined value.

7. The method according to claim 6, wherein the step of switching the mobile electronic device to the screen lock state when the displacement reaches the predetermined value comprises:

switching the mobile electronic device to the screen lock state when a vertical component of the vertical displacement reaches the predetermined value.

8. The method according to claim 6, wherein the step of switching the mobile electronic device to the screen lock state when the displacement reaches the predetermined value comprises:

dragging and displaying a screen lock frame in the touch screen from an edge of the touch screen closest to the starting point along the movement track; and turning off a function of the mobile electronic device for receiving operations.

9. The method according to claim 8, wherein the screen lock frame is a full screen frame completely covering the touch screen.

10. The method according to claim 8, wherein information displayed in the screen lock frame comprises at least one of a battery capacity, a signal strength, a date/time, a missed call, an unread e-mail, an unread short message, an unread voice mail, and a ring mode.

11. The method according to claim 8, wherein the status bar display area is fixed to an upper position of the touch screen, and information displayed in the status bar display area comprises at least one of a battery capacity, a signal strength, a date/time, and a ring mode.

12. The method according to claim 6, wherein the operation area is used for displaying a user interface when the mobile electronic device is in the operational state and receiving an operation corresponding to the user interface.

13. A mobile electronic device, comprising:

a touch panel, for receiving an input signal, wherein the touch panel comprises a non-display area and a display area;

an input signal movement detecting module, coupled to the touch panel, for determining whether a starting point of the input signal is located in the non-display area, obtaining a movement track of the input signal if the starting point is located in the non-display area, and calculating a vertical displacement of the input signal when the movement track comprises a specific direction; and a processor module, coupled to the touch panel and the input signal movement detecting module, for switching the mobile electronic device to a screen lock state when the displacement reaches a predetermined value.

14. The mobile electronic device according to claim 13, wherein the processor module is used for switching the mobile electronic device to the screen lock state when a vertical component of the vertical displacement reaches the predetermined value.

15. The mobile electronic device according to claim 13, wherein the processor module is used for dragging and displaying a screen lock frame in the display area from an edge of the display area closest to the starting point along the movement track and turning off a function of the mobile electronic device for receiving operations.

16. The mobile electronic device according to claim 15, wherein the screen lock frame is a full screen frame completely covering the display area.

17. The mobile electronic device according to claim 15, wherein information displayed in the screen lock frame comprises at least one of a battery capacity, a signal strength, a date/time, a missed call, an unread e-mail, an unread short message, an unread voice mail, and a ring mode.

18. A mobile electronic device, comprising:

a touch screen, for receiving an input signal, wherein the touch screen comprises a status bar display area and an operation area;

an input signal movement detecting module, coupled to the touch screen, for determining whether a starting point of the input signal is located in the status bar display area, obtaining a movement track of the input signal if the starting point is located in the status bar display area, and calculating a vertical displacement of the input signal when the movement track comprises a specific direction; and a processor module, coupled to the touch screen and the input signal movement detecting module, for switching the mobile electronic device to a screen lock state when the displacement reaches a predetermined value.

19. The mobile electronic device according to claim 18, wherein the processor module is used for switching the mobile electronic device to the screen lock state when a vertical component of the vertical displacement reaches the predetermined value.

20. The mobile electronic device according to claim 18, wherein the processor module is used for dragging and displaying a screen lock frame in the touch screen from an edge of the touch screen closest to the starting point along the movement track and turning off a function of the mobile electronic device for receiving operations.

21. The mobile electronic device according to claim 20, wherein the screen lock frame is a full screen frame completely covering the touch screen.

22. The mobile electronic device according to claim 20, wherein information displayed in the screen lock frame comprises at least one of a battery capacity, a signal strength, a date/time, a missed call, an unread e-mail, an unread short message, an unread voice mail, and a ring mode.

23. The mobile electronic device according to claim 18, wherein the status bar display area is fixed to an upper position of the touch screen, and information displayed in the status bar display area comprises at least one of a battery capacity, a signal strength, a date/time, and a ring mode.

24. The mobile electronic device according to claim 18, wherein the operation area is used for displaying a user interface when the mobile electronic device is in an operational state and receiving an operation corresponding to the user interface.

25. A non-transitory recording medium, for recording a computer program, wherein the computer program comprises a plurality of program codes, and the computer program is loaded into a mobile electronic device to allow the mobile electronic device to execute a method for entering a screen lock state, the method comprising: receiving an input signal through a touch panel of the mobile electronic device, wherein the touch panel comprises a display area and a non-display area; determining whether a starting point of the input signal is located in the non-display area; obtaining a movement track of the input signal if the starting point is located in the non-display area; calculating a vertical displacement of the input signal when the movement track comprises a specific direction; and switching the mobile electronic device to a screen lock state when the displacement reaches a predetermined value.

26. A non-transitory recording medium, for recording a computer program, wherein the computer program comprises a plurality of program codes, and the computer program is loaded into a mobile electronic device to allow the mobile electronic device to execute a method for entering a screen lock state, the method comprising: receiving an input signal through a touch screen of the mobile electronic device, wherein the touch screen comprises a status bar display area and an operation area; determining whether a starting point of the input signal is located in the status bar display area; obtaining a movement track of the input signal if the starting point is located in the status bar display area; calculating a vertical displacement of the input signal when the movement track comprises a specific direction; and switching the mobile electronic device to a screen lock state when the vertical displacement reaches a predetermined value.

* * * * *